US012570006B2

(12) United States Patent
Wiedemeier

(10) Patent No.: US 12,570,006 B2
(45) Date of Patent: Mar. 10, 2026

(54) CLAMPING SYSTEM, AND CHANGING SYSTEM COMPRISING THE SAME

(71) Applicant: SUHNER Schweiz AG, Lupfig (CH)

(72) Inventor: Stefan Wiedemeier, Lupfig (CH)

(73) Assignee: Suhner Schweiz AG, Lupfig (CH)

( * ) Notice: Subject to any disclaimer, the term of this patent is extended or adjusted under 35 U.S.C. 154(b) by 0 days.

(21) Appl. No.: 19/065,484

(22) Filed: Feb. 27, 2025

(65) Prior Publication Data

US 2025/0281983 A1 Sep. 11, 2025

(30) Foreign Application Priority Data

Mar. 7, 2024 (EP) .................................... 24162122

(51) Int. Cl.
*B25J 15/04* (2006.01)
*B23B 31/107* (2006.01)

(52) U.S. Cl.
CPC ....... *B25J 15/0416* (2013.01); *B25J 15/0491* (2013.01); *B23B 31/1071* (2013.01); *Y10S 483/901* (2013.01); *Y10T 483/1793* (2015.01)

(58) Field of Classification Search
CPC ............... Y10S 483/901; B25J 15/0491; B25J 15/0416; B25J 15/0408; B25J 15/04; B23B 31/1071; Y10T 483/1745
USPC .................................................. 483/901, 35
See application file for complete search history.

(56) References Cited

U.S. PATENT DOCUMENTS

| | | | | | |
|---|---|---|---|---|---|
| 4,897,014 | A | * | 1/1990 | Tietze ................. | B25J 15/0491 |
| | | | | | 414/729 |
| 5,018,266 | A | * | 5/1991 | Hutchinson .............. | B25J 15/04 |
| | | | | | 901/41 |
| 5,044,063 | A | * | 9/1991 | Voellmer ........... | B23Q 3/15553 |
| | | | | | 483/902 |
| 10,335,957 | B2 | * | 7/2019 | Zachary ............... | B25J 15/0416 |
| 12,048,978 | B2 | * | 7/2024 | Hsu .................... | B23Q 3/15506 |
| 2017/0239823 | A1 | * | 8/2017 | Bellandi .............. | B25J 15/0458 |
| 2024/0198539 | A1 | * | 6/2024 | Hopkins .............. | B25J 15/0491 |

(Continued)

FOREIGN PATENT DOCUMENTS

| | | | | |
|---|---|---|---|---|
| AT | | 12282 U1 | * | 3/2012 |
| DE | | 10304507 B3 | | 10/2004 |
| EP | | 1590134 B1 | | 10/2010 |

(Continued)

*Primary Examiner* — Erica E Cadugan
(74) *Attorney, Agent, or Firm* — Volpe Koenig

(57) ABSTRACT

A clamping system having first and second clamping mechanisms with respective contact faces, that are couplable such that the contact faces press together with a coupling force. The first clamping mechanism has first and second elements and at least three clamping spheres, the first and second elements being twistable relative to one another, and the clamping spheres being mounted on fixed positions of the second element to be rollable along a circular line. The second clamping mechanism has groove guides assigned to the clamping spheres which have helical groove courses in clamping portions. When coupling the clamping mechanisms, by twisting the second element relative to the first, first regions of the clamping spheres are moved to a clamping position which presses the contact faces together via coupling force. When coupling, the clamping spheres in the clamping portions roll over large distances, leading to low wear and activation with reduced force.

15 Claims, 6 Drawing Sheets

(56)            References Cited

U.S. PATENT DOCUMENTS

2024/0424579 A1 *  12/2024  Takebayashi  ........ B25J 15/0416

FOREIGN PATENT DOCUMENTS

| | | | |
|---|---|---|---|
| EP | 4613446 A1 * | 9/2025 | |
| GB | 2196314 A * | 4/1988 | |
| JP | 7184501 B2 | 12/2022 | |
| JP | 2023027544 A | 3/2023 | |

* cited by examiner

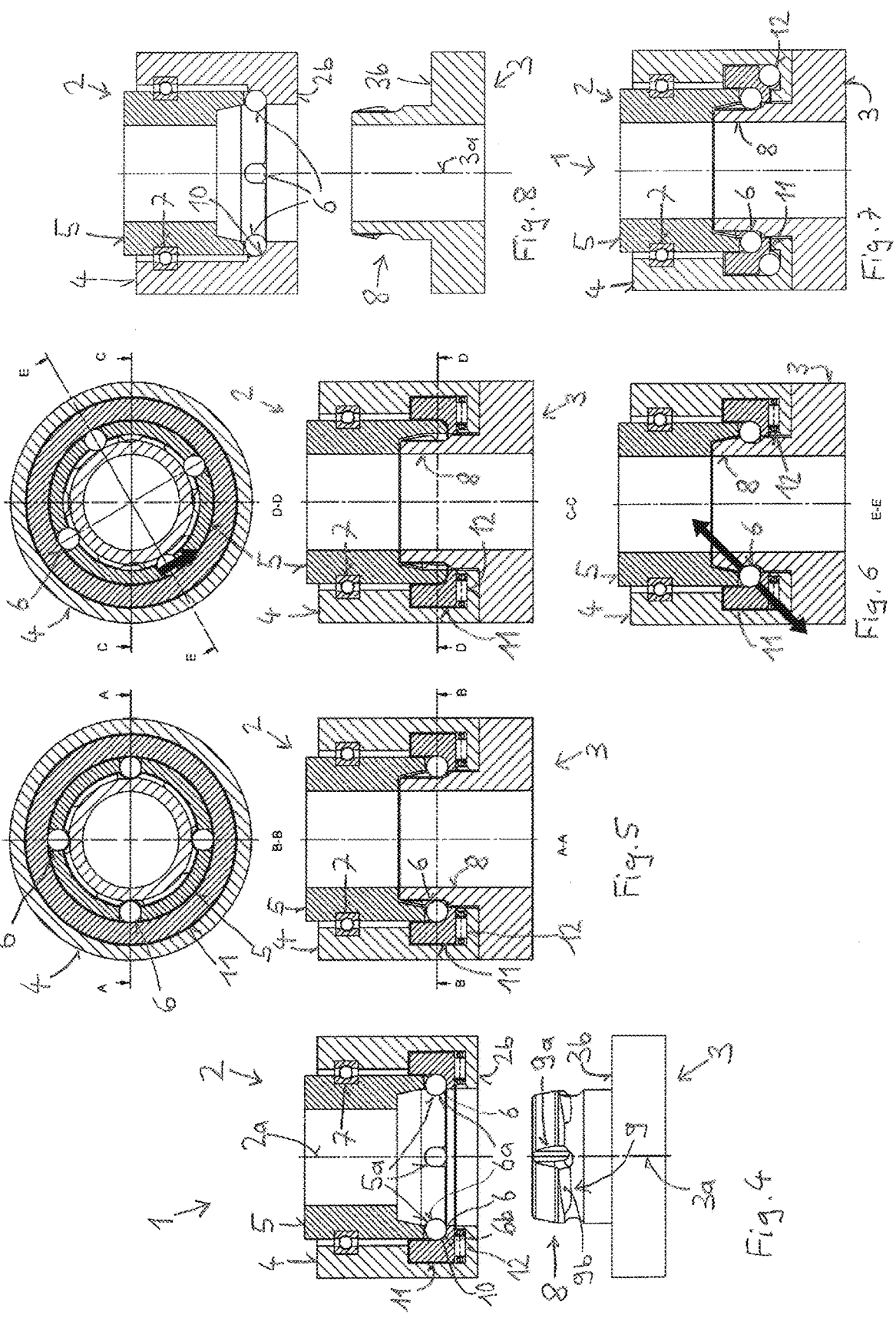

CLAMPING SYSTEM, AND CHANGING SYSTEM COMPRISING THE SAME

CROSS-REFERENCE TO RELATED APPLICATIONS

This application claims priority to European Patent Application No. 24162122.6, filed Mar. 7, 2024, which is incorporated herein by reference as if fully set forth.

TECHNICAL FIELD

The invention relates to a clamping system, and to a changing system comprising the same.

BACKGROUND

When machining workpieces, tools and/or process-related aids such as measuring probes or grippers are used. In robotics, machining and measuring means which are disposed as last elements on kinematic chains are referred to as end effectors. End effectors can be fastened to machines or robotic arms in defined positions and alignments and replaced with the aid of clamping systems. Fastening and replacing can take place manually, or by a changing system.

A changing system comprises a magazine for end effectors, at least one end effector, and at least one clamping system. Of the clamping system, a first clamping mechanism is disposed on a robotic arm, and a second clamping mechanism is disposed on the at least one end effector, for example. During a changing procedure, the end effector is gripped by the robotic arm at the magazine, by coupling the first and the second clamping mechanism, or deposited in the magazine by decoupling, for example. A measure of the speed of the changing system is the end effector changing time. The sequence, or the logic, of the changing procedure is established by a machine controller.

Customary clamping systems comprise a first and a second clamping mechanism, which have in each case one mechanism axis and a contact face about the mechanism axis. The two clamping mechanisms are able to be coupled in the direction of a coupling axis in such a way that their contact faces rest on one another while being impinged with a coupling force, and their mechanism axes lie on the coupling axis.

In many known clamping systems, spheres in one of the two clamping mechanisms are mounted so as to be displaceable radially to the mechanism axis. A groove which is adapted to this sphere diameter is formed so as to be annular about the mechanism axis in the other clamping mechanism. Prior to building up the coupling force, the centers of the spheres are displaced in their guides in the direction of the coupling axis, somewhat toward the center of the groove. In order to build up the coupling force, an activation member initially presses the spheres in the radial direction onto a groove periphery which, when viewed in the longitudinal section, extends transversely to the coupling axis. In the process, forces from the spheres act perpendicularly on the groove periphery. These forces move the clamping mechanism with the groove into the clamping mechanism with the spheres to the extent that the contact faces of the two clamping mechanisms rest on one another while being impinged with the desired coupling force.

DE 103 04 507 B3 shows a clamping system having an annular clamping mechanism in which two spheres, and therebetween a spacer, are in each case displaceably mounted at angular spacings of 120° in bores which are radial to the mechanism axis. For radially displacing the pairs of spheres with the respective spacer lying therebetween, an annular activation member is disposed radially outside on the annular clamping mechanism, which activation member comprises locking segments with ramp portions in three angular ranges of in each case 120°. A bolt-shaped clamping mechanism having an annular groove is pushed into the through-opening of the annular clamping mechanism. Thereafter, the activation member is twisted relative to the bores with the spheres and the spacers in such a way that the ramp portions of the activation member press the radially inner spheres into the groove of the bolt-shaped clamping mechanism, and in the process press the contact faces of the two clamping mechanisms onto one another while being impinged with the desired coupling force. High forces are created between the inner spheres and the groove periphery onto which the spheres are pressed, said forces leading to undesirable wear in the case of many clamping procedures.

SUMMARY

The object according to the invention now lies in finding a solution which is of a simple construction and is easy to be activated, and also shows ideally few effects of wear even in the case of many clamping procedures.

This object is achieved by a clamping system having one or more of the features disclosed herein, and by a tool changer having this clamping system. Advantageous variants of embodiments, which achieve additional objects, are described in the description and claims that follow.

In the context of a first inventive step, it has been recognized that the effects of wear in clamping systems having radially moving spheres are created in that the build-up of a coupling force between the contact faces of the two clamping mechanisms takes place by way of a minimum radial movement of the spheres when contacting a support face to be moved. In the process, the entire build-up of force has an effect on a small extent of the support face.

In the context of a second inventive step, it has been recognized that the build-up of force can take place over a larger extent of a support face when the support face extends in the circumferential direction, and the clamping spheres are moved in the circumferential direction for building up the coupling force.

A clamping system according to the invention comprises a first and a second clamping mechanism which have a first and a second mechanism axis, respectively, and a first and second contact face about the first and second mechanism axis, respectively. The first and the second clamping mechanism are able to be coupled in the direction of a coupling axis in such a way that the first and the second contact face rest on one another while being impinged with a coupling force, and the first mechanism axis, and preferably the second mechanism axis, lie on the coupling axis.

The first clamping mechanism comprises a first element, a second element and at least three clamping spheres. The first and the second element are able to be twisted relative to one another about the first mechanism axis. The at least three clamping spheres are mounted at positions of the second element, which are fixed in the circumferential direction and in the radial direction, so as to be able to roll along a circular line leading about the first mechanism axis.

The second clamping mechanism has in a groove element at least three groove guides which are disposed at identical angular spacings to the clamping spheres along a circular line leading about the second mechanism axis. Each groove guide extends in each case in an access region for introducing the clamping spheres parallel to the second mechanism axis, and subsequently in a clamping portion partially about the second mechanism axis. The clamping portions are formed by helical groove courses having tangential components about the rotation axis, and having components parallel to the rotation axis.

The clamping spheres by way of in each case a first region protrude from the second element and are radially spaced apart from the first mechanism axis in such a way that, when coupling the first clamping mechanism to the second clamping mechanism, the first regions of the clamping spheres in an introduction position of the second element are able to be guided through the access regions into the clamping portions. By twisting the second element relative to the first element about the coupling axis, the first regions of the clamping spheres are able to be moved in the clamping portions to a clamping position, the first regions of the clamping spheres due to the movement along the helical groove courses rendering the first and the second contact face able to be pressed against one another by way of the coupling force.

In the clamping system according to the invention, the coupling force is built up by a movement of the clamping spheres along the helical groove courses, which each extend over an angular range about the coupling axis. The maximum angular range of a clamping portion is derived by subtracting from 360° the sum of the angular ranges of all access regions and dividing the remaining angle by the number of clamping spheres. Depending on the spacing between the groove courses and the second mechanism axis, a maximum distance is assigned to the maximum angular range, which can be traveled by a clamping sphere in contact with the clamping portion to build up force. This maximum distance is much larger than in the solutions known from the prior art, having spheres that are moved radially to build up force. Accordingly, there is less wear on the material in the solution according to the invention.

Preferably, the first clamping mechanism has a support face to the clamping spheres, which extends preferably rotationally symmetrically about the first mechanism axis, the clamping spheres resting on the support face when the second regions face away from the first regions. The clamping spheres are located between the clamping portions and the support face when the second element is twisted relative to the first element. The pitch of the groove courses is selected in such a way that when the second element is twisted, the groove element is moved in the direction of the coupling axis in such a way that the contact faces of the two clamping mechanisms are moved toward one another and pressed against one another. In the process, the clamping spheres transmit forces between the clamping portions and the support face.

According to an advantageous embodiment, the first clamping mechanism comprises a third element which is disposed between the first and the second element and is mounted on the first and/or the second element so as to be rotatable about the first mechanism axis, the support face to the clamping spheres being formed on the third element. The rotatability of the third element and of the support face formed thereon allows the clamping spheres to perform substantially a rolling movement both on the clamping portions and on the support face when the second element is being twisted. This rolling movement reduces the friction forces between the clamping spheres and the clamping portions and the support face that arise during clamping.

When the second element is being twisted, the third element is twisted by a larger angle than the second element, due to the rolling movement.

An embodiment in which the third element is mounted on the first element by way of a rotary bearing extending so as to be rotationally symmetrical about the first mechanism axis is particularly advantageous. During coupling, the third element is set in rotation by the clamping spheres by virtue of their movement along the helical groove courses and by virtue of their rotation and contact with the support face. The rotary bearing reduces the friction between the rotating third element and the non-rotating first element arising when building up the coupling force.

The rotary bearing is preferably formed by a needle bearing or, if necessary, by bearing balls. The bearing faces, between which the needles or balls of the rotary bearing are disposed, are aligned in a particularly advantageous design in section planes with the first mechanism axis in such a way that the forces transmitted by the clamping spheres to the third element at angles to the first mechanism axis are dissipated to the first element at substantially the same angles. This reduces the friction between the third and the first element, and the dissipation of force also has the effect that the first and the second mechanism axes are centered, or coincide.

In a further advantageous embodiment, the clamping system comprises a rotating mechanism which renders the second element rotatable relative to the first element about the first mechanism axis, between the introduction position and the clamping position. The rotating mechanism can rotate the second element to the introduction position before coupling and, after introducing the clamping spheres into clamping portions, rotate the second element relative to the first element with the clamping spheres in the clamping portions to the clamping position. For separating the two clamping mechanisms, the rotating mechanism rotates the second element from the clamping position to the introduction position.

When the rotating mechanism comprises a spring mechanism and an activation mechanism, the second element is moved in one of the two directions of rotation by the spring mechanism and in the other by the activation mechanism. Preferably, the spring mechanism holds the second element by a preload force in the clamping position relative to the first element, and the activation mechanism moves the second element relative to the first element, counter to the preload force, to the introduction position.

In an advantageous embodiment, the clamping system comprises an alignment mechanism which has on the first clamping mechanism and on the second clamping mechanism engagement elements which engage in one another in a defined relative alignment of the first clamping mechanism in relation to the second clamping mechanism about the coupling axis. The engagement elements are disposed in such a way that, when coupling the two clamping mechanisms to the second element, the clamping spheres are able to be introduced into the access regions in the introduction position. The alignment mechanism prevents rotational relative movements about the coupling axis between the first and the second clamping mechanism in the predetermined relative alignments.

The clamping mechanism according to the invention can be used in a variety of ways. Adapted to the respective application, the first clamping mechanism comprises a first connection mechanism which is able to be connected to a machine part, preferably a robotic arm, for example. The second clamping mechanism comprises a second connection mechanism which is able to be connected to an end effector, for example.

When the clamping system is used together with an end effector with a drivable tool, the first clamping mechanism preferably comprises a drive having a drive shaft and the second clamping mechanism comprises an output shaft which, when coupling the first clamping mechanism to the second clamping mechanism, is able to be brought to connect to the drive shaft in such a way that a rotating movement of the drive shaft is able to be transmitted to a rotating movement of the output shaft. The arrangement of the drive on the first clamping mechanism allows the end effectors to be set up without drives, and the drive connection is created directly when the two clamping mechanisms are coupled.

In order that the drive shaft and the output shaft can be connected during coupling, the clamping system preferably comprises a first shaft end and a second shaft end having a first and a second formed contour, respectively. The first formed contour can be brought to engage in a form-fitting manner with the second formed contour. In order to achieve the form fit, the two shaft ends must be brought into contact with one another by way of shaft axes lying on top of one another and matching rotational positions, corresponding to the formed contours, about the shaft axes.

The formed contours are designed in such a way that they engage in one another in at least one relative rotational position. Preferably, the formed contours are formed such that the form fit in an integer n of rotational positions can be achieved, wherein the rotation angle between two successive rotational positions is a whole fraction of 360°, i.e. 360°/n. Common formed contours for form-fitting connections have, for example, twist angles of 60° between two successive rotational positions, and can correspondingly engage in one another in 6 different twist positions.

In order that a form-fitting connection between the drive shaft and output shaft is formed without any disruption during coupling, regardless of the rotational alignments of the drive shaft and the output shaft prior to coupling, a rotational alignment device is formed between the first shaft end and the second shaft end. The rotational alignment device renders the rotational alignments of the drive shaft and the output shaft achievable by the relative coupling movement along the coupling axis, and comprises on one shaft end at least one alignment groove, and on the other shaft end at least one movable engagement element which is preloaded against the first shaft end.

The number of the alignment grooves and/or of the preloaded, movable engagement elements preferably corresponds to the number n of different twist positions in which the formed contours can engage with one another. Each alignment groove extends helically over an angular range which corresponds at least to the twist angle between two successive rotational positions with a form fit, i.e. at least over 360°/n. In the case of more than one alignment groove, the alignment grooves are distributed at angular spacings about the shaft axis, the angular spacings preferably being of substantially identical size.

Each alignment groove has a groove width between two groove peripheries and the at least one engagement element can enter the alignment groove at the beginning of the entrance of each alignment groove in a region between the groove peripheries. The angular range over which each alignment groove extends helically comprises the region in which the at least one engagement element can enter the beginning of the entrance of the alignment groove.

During coupling, the at least one preloaded, movable engagement element, by way of a free end, can now directly enter an alignment groove, or at the first shaft end by way of the free end meets a groove-free region adjoining the upper edge of the alignment groove, is pushed against the second shaft end by this groove-free region and, during further coupling, runs on the groove-free region until it meets a portion of an alignment groove and, due to the preload, by way of the free end enters the latter. Once the at least one preloaded, movable engagement element by way of its free end has entered an alignment groove and follows this while coupling continues, the relative rotational alignment between the first and the second shaft end is altered until a form-fitting connection between the drive shaft and the output shaft can be achieved in the relative rotational alignment reached by a relative movement along the shaft axis.

The rotational alignment device ensures that, regardless of the respective relative rotational alignment between the first and the second shaft end, a form-fitting connection between the drive shaft and the output shaft is always achievable.

A changing system according to the invention comprises a robotic arm, a magazine for end effectors, at least one end effector and at least one clamping system having on or more of the features described herein, wherein the first or the second clamping mechanism of the at least one clamping system is disposed on the robotic arm, and the second or first clamping mechanism, respectively, of the at least one clamping system is disposed on the at least one end effector.

BRIEF DESCRIPTION OF THE DRAWINGS

The invention will be described in more detail hereunder with reference to several figures, which show.

DETAILED DESCRIPTION

Figures 1, 2, 3:
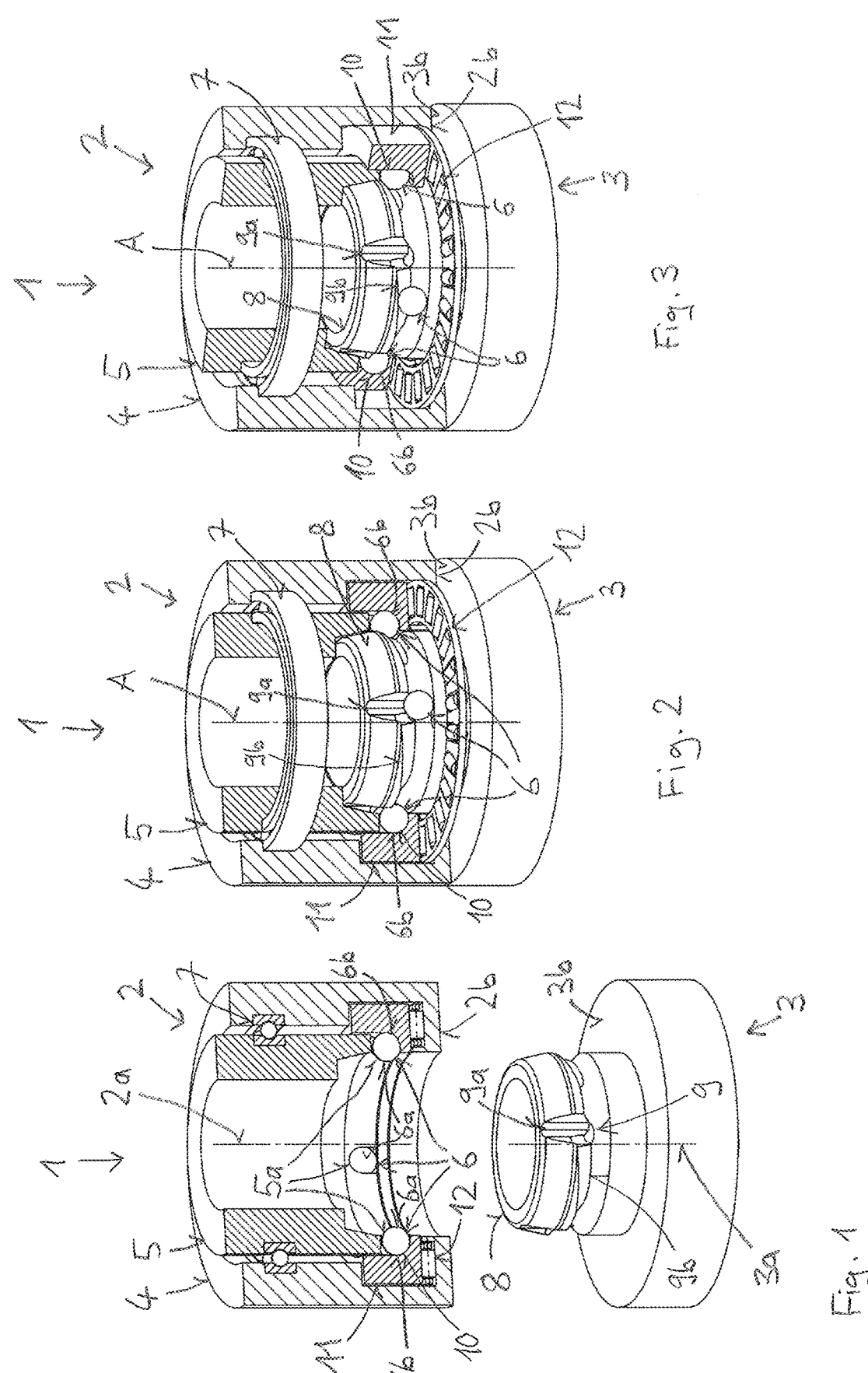
FIG. 1 a perspective illustration of the clamping system prior to coupling of the first clamping mechanism to the second clamping mechanism, FIG. 2 a perspective illustration of the clamping system after the second clamping mechanism is inserted into the first clamping mechanism, FIG. 3 a perspective illustration of the clamping system in the clamping position, FIG. 4 an illustration of a sectional and lateral view pertaining to FIG. 1, FIG. 5 an illustration of a cross-sectional and longitudinal sectional view pertaining to FIG. 2, FIG. 6 illustrations of one cross-sectional and two longitudinal sectional views pertaining to FIG. 3, FIG. 7 an illustration of a longitudinal sectional view of the clamping system in which the first clamping mechanism has a ball bearing between the first and the third element, FIG. 8 an illustration of a sectional and lateral view prior to coupling the first clamping mechanism to the second clamping mechanism, wherein the first clamping mechanism has the support face on the first element, FIG. 9 a perspective illustration of the clamping system having a rotating mechanism prior to inserting the second clamping mechanism into the first clamping mechanism, FIG. 10 a perspective illustration of the clamping system having a rotating mechanism during clamping, FIG. 11 a perspective illustration of the clamping system having a rotating mechanism after clamping, FIG. 12 an illustration of a clamping system having a connectable drive shaft and output shaft, FIG. 13 a perspective illustration of a rotational alignment device, FIG. 14 a perspective illustration of a changing system having a robotic arm with an end effector, and having a magazine for end effectors, FIG. 15 a perspective illustration of the end region of a robotic arm with an end effector removed from the magazine, FIG. 16 a perspective illustration of the end region of a robotic arm prior to removing an end effector from the magazine, FIG. 17 a perspective illustration of the end region of a robotic arm with the activation mechanism of the clamping system in the introduction position, FIG. 18 a perspective illustration of the end region of a robotic arm with fully converged clamping mechanisms, and FIG. 19 a perspective illustration of the end region of a robotic arm when removing the end effector.

FIGS. 1 to 8 show a clamping system 1 having a first clamping mechanism 2 and a second clamping mechanism 3, which have a first and a second mechanism axis 2*a*, 3*a*, respectively, and a first or a second contact face 2*b*, 3*b* about the first or second mechanism axis 2*a*, 3*a*, respectively. The clamping mechanisms 2, 3 can be coupled in the direction of a coupling axis A in such a way that the first and the second contact face 2*b*, 3*b* rest on one another while being impinged with a coupling force and the first and the second mechanism axis 2*a*, 3*a* lie on the coupling axis A.

The first clamping mechanism 2 comprises a first element 4, a second element 5 and at least three clamping spheres 6. The first and the second element 4, 5 are connected to one another by a bearing 7, so as to be rotatable about the first mechanism axis 2*a*. The at least three clamping spheres 6 are mounted at positions 5*a* of the second element 5, which are fixed in the circumferential direction and in the radial direction, so as to be able to roll along a circular line leading about the first mechanism axis 2*a*.

The second clamping mechanism 3 has in a groove element 8 at least three groove guides 9 which are disposed at identical angular spacings to the clamping spheres 6 along a circular line leading about the second mechanism axis 3*a*. Each groove guide 9 extends in each case in an access region 9*a* for introducing the clamping spheres 6 parallel to the second mechanism axis 3*a*, and subsequently in a clamping portion 9*b* partially about the second mechanism axis 3*a*. The clamping portions 9*b* are formed by helical groove courses having tangential components about the second mechanism axis 3*a* and having components parallel to the second mechanism axis 3*a*.

The clamping spheres 6 by way of in each case a first region 6*a* protrude from the second element 5 and are radially spaced apart from the first mechanism axis 2*a* in such a way that, when coupling the first clamping mechanism 2 to the second clamping mechanism 3, the first regions 6*a* of the clamping spheres 6 in an introduction position of the second element 5 are able to be guided through the access regions 9*a* into the clamping portions 9*b*. By twisting the second element 5 relative to the first element 4 about the coupling axis A, the first regions 6*a* of the clamping spheres 6 are able to be moved in the clamping portions 9*b* to a clamping position, the first regions 6*a* of the clamping spheres 6 pressing the first and the second contact face 2*b*, 3*b* against one another by way of the coupling force due to the movement along the helical groove courses.

In the embodiments illustrated, the first clamping mechanism 2 has a support face 10 to the clamping spheres 6, which extends rotationally symmetrically about the first mechanism axis 2*a*, the clamping spheres 6 resting on the support face 10 when second regions 6*b* face away from the first regions. When twisting the second element 5 relative to the first element 4, the clamping spheres 6 are located between the clamping portions 9*b* and the support face 10. The pitch of the groove courses is selected in such a way that when the second element 5 is twisted, the groove element is moved in the direction of the coupling axis A in such a way that the contact faces 2*b*, 3*b* of the two clamping mechanisms 2, 3 are moved toward one another and pressed against one another. In the process, the clamping spheres 6 transmit forces between the clamping portions 9*b* and the support face 10.

In the embodiments of FIGS. 1 to 7, the first clamping mechanism 2 comprises a third element 11 which is disposed between the first and second elements 4, 5 and is mounted on the first element 4 so as to be rotatable about the first mechanism axis 2*a*, the support face 10 to the clamping spheres 6 being formed on the third element 11. The rotatability of the third element 11 and the support face 10 formed thereon enables the clamping spheres 6 to perform substantially a rolling movement on both the clamping portions 9*b* and on the support face 10 when the second element 5 is being twisted. This rolling movement reduces the friction forces between the clamping spheres 6 and the clamping portions 9*b* and the support face 10 that arise during clamping. When the second element 5 is being twisted, the third element 11 is twisted by a larger angle than the second element 5, due to the rolling movement.

In the embodiment illustrated, the third element 11 is mounted on the first element 4 by way of a rotary bearing 12, for example a needle bearing, which extends so as to be rotationally symmetrical about the first mechanism axis 2*a*. During coupling, the third element 11 is set in rotation by the clamping spheres 6 due to their movement along the clamping portions 9*b*. The rotary bearing 12 reduces the friction occurring during the build-up of the coupling force between the rotating third element 11 and the non-rotating first element 4.

FIG. 6 visualizes with bold arrows the forces acting from the clamping spheres 6 on the third element 11, and correspondingly on the groove element 8, during clamping. Therefore, the first clamping mechanism 2 comprises substantially only a first element 4, a second element 5 and at least three clamping spheres 6.

In the embodiment according to FIG. 7, the rotary bearing 12 is formed by bearing balls, the bearing faces of the bearing balls being aligned in section planes with the first mechanism axis in such a way that the forces transmitted from the clamping spheres 6 to the third element 11 at angles to the first mechanism axis 2*a* are dissipated to the first element 4 at substantially the same angles. This reduces the friction, and the dissipation of force also has the effect that the first and the second mechanism axis 2*a*, 3*a* are centered, or coincide on the coupling axis A.

In the embodiment according to FIG. 8, the support face 10 is formed on the first element 4, and the first clamping mechanism 2 consists substantially of only the first element 4, the second element 5, the bearing 7 disposed between these two elements, and the at least three clamping spheres 6 held in the second element.

In the embodiments of FIGS. 9 to 12 and 14 to 19, the clamping system 1 comprises a rotating mechanism which renders the second element 5 rotatable relative to the first element 4 about the first mechanism axis 2*a*, between the introduction position and the clamping position. The rotating mechanism illustrated comprises a spring mechanism 13 and an activation mechanism 14. The second element 5 is moved in one of the two directions of rotation by the spring mechanism 13 and in the other by the activation mechanism 14. Preferably, the spring mechanism 13 holds the second element 5 by a preload force in the clamping position relative to the first element 4, and the activation mechanism 14 moves the second element 5 relative to the first element 4, counter to the preload force, to the introduction position.

Figures 9, 10, 11, 12, 13:
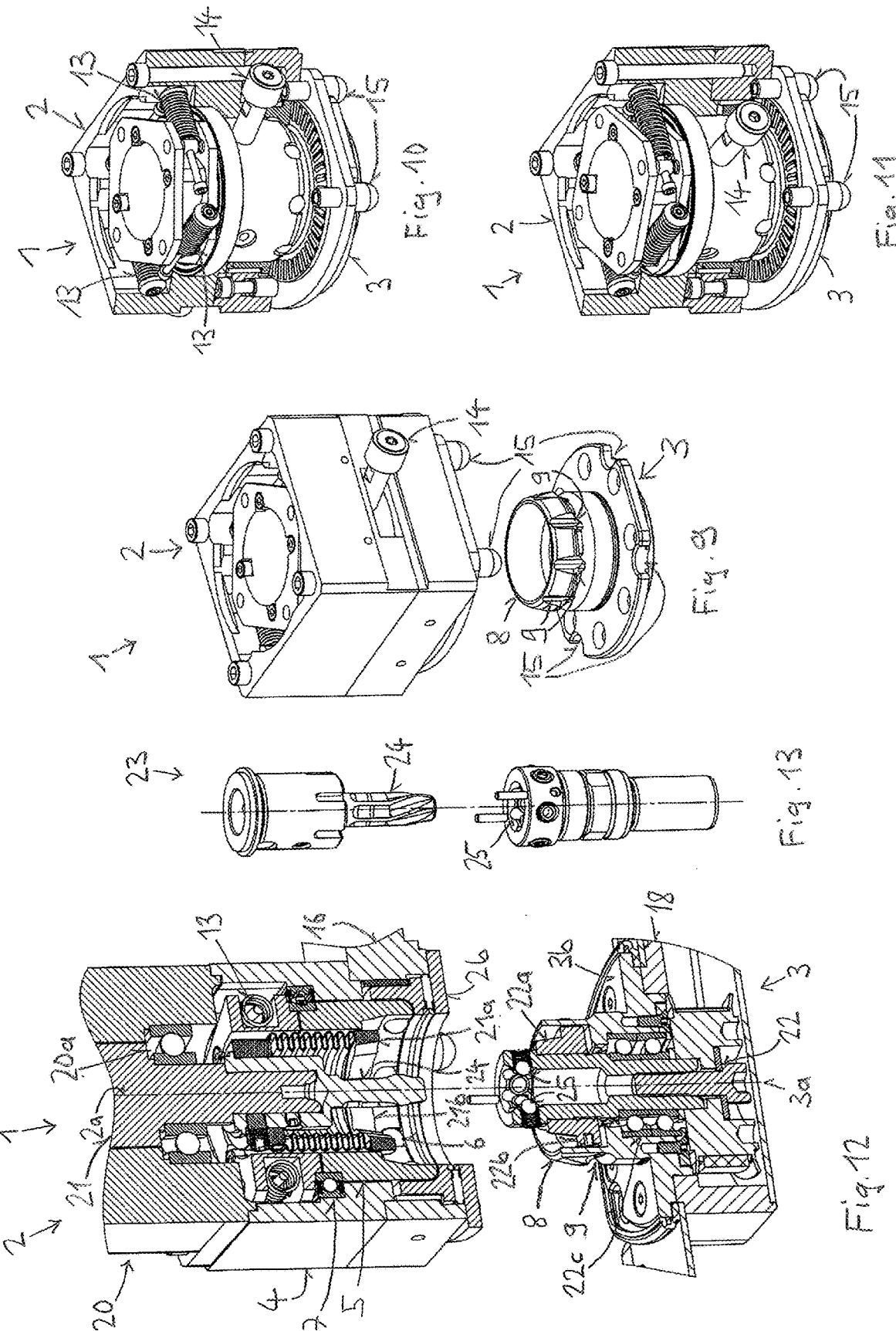

FIGS. 9 to 11 show an alignment mechanism which has on the first clamping mechanism 2 and on the second clamping mechanism 3 engagement elements 15 which engage in one another in a defined relative alignment of the first clamping mechanism 2 in relation to the second clamping mechanism 3 about the coupling axis. The engagement elements 15 are disposed in such a way that, when coupling the two clamping mechanisms 2, 3 and when the second element 5 is in the introduction position, the clamping spheres 6 are able to be introduced into the access regions 9*a*.

Figures 14, 15:
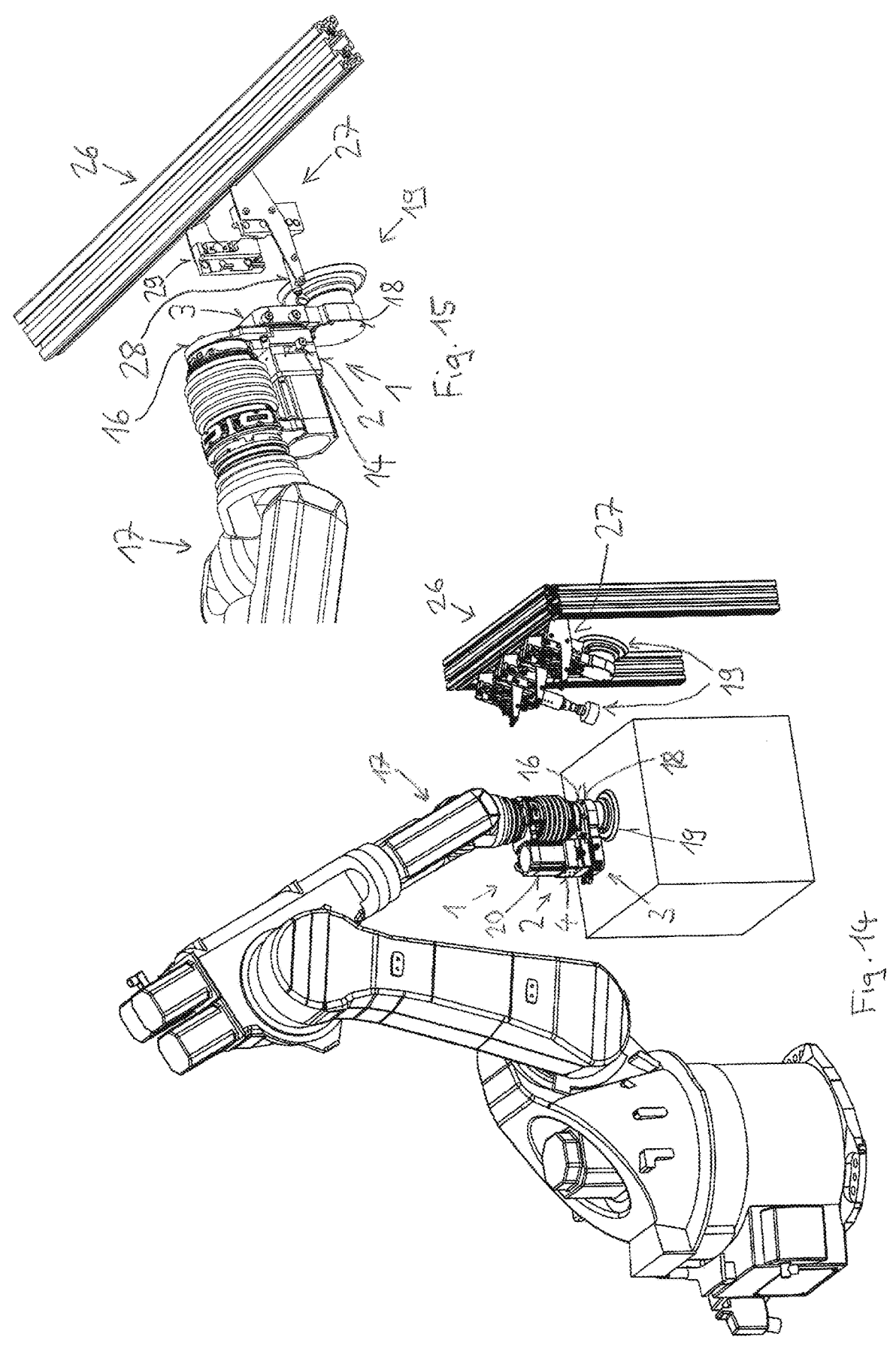

The first clamping mechanism 2 comprises a first connection mechanism 16 which according to FIG. 14 is able to be connected to the free end of a robotic arm 17. The second clamping mechanism 3 comprises a second connection mechanism 18 which is able to be connected to an end effector 19.

Figure 20:
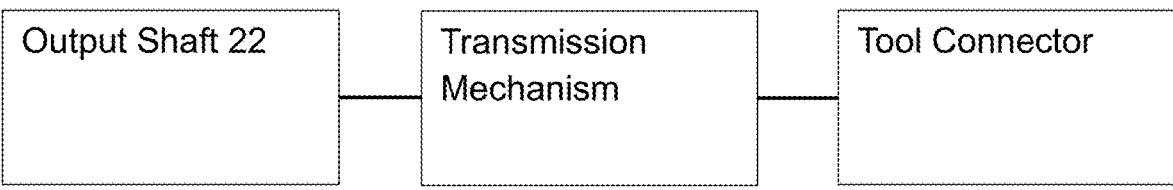
FIG. 20 is a schematic view of an aspect of the arrangement for rotating a drivable tool.

The clamping system 1 illustrated is used conjointly with an end effector 19 with a drivable tool. The first clamping mechanism 2 comprises, as illustrated in FIG. 12, a drive 20 having a drive shaft 21 and a drive shaft bearing 20*a*, and the second clamping mechanism 3 comprises an output shaft 22 which, when coupling the first clamping mechanism 2 to the second clamping mechanism 3, is connected in a torque-transmitting manner to the drive shaft 21 and is mounted on the second clamping mechanism 3 by way of an output shaft bearing 22*c*. The second connection mechanism (18) includes a drive transmission to connect the output shaft (22) to a tool connector, as schematically shown in FIG. 20.

FIG. 12 shows for connecting the drive shaft 21 to the output shaft 22 on the first clamping mechanism 2 a first shaft end 21*a*, and on the second clamping mechanism 3 a second shaft end 22*a*, having a first or a second formed contour 21*b*, 22*b*, respectively. The first formed contour 21*b* can be brought to engage in a form-fitting manner with the second formed contour 22*b*. In order to achieve a form fit, the two shaft ends 21*a*, 22*a* are brought into contact with one another by way of shaft axes lying on top of one another and matching rotational positions, corresponding to the formed contours 21*b*, 22*b*, about the shaft axes. The formed contours 21*b*, 22*b* are designed, for example, in such a way that they engage in one another in six relative rotational positions. An angle of 60° lies between two successive rotational positions.

In order that a form-fitting connection between the drive shaft 21 and output shaft 22 is formed without any disruption during coupling, regardless of rotational alignments of the drive shaft 21 and the output shaft 22 prior to coupling, according to FIGS. 12 and 13 a rotational alignment device 23 is formed between the first shaft end 21*a* and the second shaft end 22*a*. The rotational alignment device 23 comprises on the first shaft end 21*a*, or on a part of the rotational alignment device 23 that is connected to the first shaft end 21*a* and the drive shaft 21, at least one alignment groove 24, and on the second shaft end 22*a*, or an a part of the rotational alignment device 23 that is connected to the second shaft end

22*a* and the output shaft 22, at least one movable engagement element 25 which is preloaded toward a region having the at least one alignment groove 24.

The embodiment illustrated comprises 4 or 6 alignment grooves 24, and 4 or 6 preloaded, movable engagement elements 25. Each alignment groove 24 extends helically over an angular range which corresponds at least to the twist angle between two successive rotational positions with a form fit, in the present embodiment over 90° or 60°, respectively. The alignment grooves 24 are distributed at angular spacings about the shaft axis, the angular spacings preferably being substantially identical.

During coupling, the at least one preloaded, movable engagement element 25 can enter by way of a free end directly into an alignment groove 24. When the free end meets a groove-free region adjoining the upper periphery of the alignment groove 24, it is pushed back by this groove-free region counter to the preload and, during further coupling, runs on the groove-free region until it meets a portion of an alignment groove 24 and, due to the preload, by way of the free end enters the latter. Once the at least one preloaded, movable engagement element 25 by way of its free end has entered an alignment groove 24 and follows this while coupling continues, the relative rotational alignment between the first and the second shaft end 21*a*, 22*a* is altered until a form-fitting connection is created between the drive shaft 21 and output shaft 22.

The rotational alignment device 23 ensures that, regardless of the respective relative rotational alignment between the first and the second shaft end 21*a*, 22*a*, a form-fitting connection between the drive shaft 21 and the output shaft 22 is always achievable.

A changing system according to FIGS. 14 to 19 comprises a robotic arm 17, a magazine 26 for end effectors 19, at least one end effector 19 and at least one clamping system 1 according to the invention. In this case, the first clamping mechanism 2 of the at least one clamping system 1 is disposed on the robotic arm 17, and the second clamping mechanism 3 of the at least one clamping system 1 is disposed on the at least one end effector 19. At the mounting positions of the end effectors 19, the magazine 26 comprises in each case one guide rail 28 which interacts with the activation mechanism 14 of the first clamping mechanism 2 and thereby enables coupling and decoupling.

FIGS. 14 to 19 show the changing system having the robotic arm 17, the magazine 26 and the rotational alignment system 1 in the working position (FIG. 14) and when changing the end effector 19 (FIGS. 15 to 19).

In FIG. 14, the second clamping mechanism 3 is connected to the first clamping mechanism 2 in such a way that the second connection mechanism 18 leads to the free end of the robotic arm 17. In FIG. 15, the second clamping mechanism 3 is connected to the first clamping mechanism 2 in such a way that the second connection mechanism 18 leads away from the free end of the robotic arm 17.

The different alignments of FIGS. 14 and 15 are made possible by the alignment elements 15 which are formed on the first clamping mechanism 2 and on the second clamping mechanism 3 and engage in predetermined relative alignments of the first clamping mechanism 2 in relation to the second clamping mechanism 3 about the coupling axis. The relative alignments predetermined by the alignment elements 15 are adapted to the positions of the clamping spheres 6 and of the access regions 9*a* of the groove guides 9 in such a way that the clamping spheres 6 are able to be introduced into the access regions 9*a* of the groove guides 9 in the predetermined relative alignments.

The magazine 26 comprises holding devices 27 for the end effectors 19. The holding devices 27 each comprise a guide rail 28 and an attachment assembly 29. The guide rail 28 enables the activation of the activation mechanism 14 in the case of a corresponding movement of the robotic arm 17. The attachment assembly 29 enables the attachment and detachment of an end effector 19 in the case of a corresponding movement of the robotic arm 17.

FIGS. 16 to 19 show in the sequence 16, 17, 18, 19 the connection of the robotic arm 17 to an end effector 19, and in the sequence 19, 18, 17, 16 the release of the end effector 19 from the robotic arm 17.

Figures 16, 17, 18, 19:

According to FIG. 16, the free end of the robotic arm 17 having the first clamping mechanism 2 is positioned vertically slightly higher than the second clamping mechanism 3 of the end effector 19 in the magazine 26.

According to FIG. 17, after a horizontal and then vertical downward movement of the free end of the robotic arm 17, the second element 5 of the first clamping mechanism 2 is rotated to the introduction position as a result of the movement of the activation mechanism 14 relative to the first element 4, which is achieved when in contact with the guide rail 28.

According to FIG. 18, proceeding from the situation according to FIG. 17, the first clamping mechanism 2 and the second clamping mechanism 3 are converged by a horizontal movement.

According to FIG. 19, after a vertical upward movement of the free end of the robotic arm 17, the activation mechanism 14 is lifted from the guide rail 28 in such a way that the spring mechanism 13 reaches the clamping position. Due to the upward movement, the end effector 19 is removed from the attachment assembly 29 and can be moved to a working region.

The invention claimed is:

1. A clamping system (1), comprising:

a first clamping mechanism (2), which has a first mechanism axis (2a) and, about the first mechanism axis (2a), a first contact face (2b);

a second clamping mechanism (3), which has a second mechanism axis (3a) and, about the second mechanism axis (3a), a second contact face (3b);

the first and the second clamping mechanism (2, 3) being able to be coupled in a direction of a coupling axis (A) such that the first and the second contact face (2b, 3b) rest on one another while being impinged with a coupling force;

the first clamping mechanism (2) comprises a first element (4), a second element (5) and at least three clamping spheres (6), the first and the second element (4, 5) being able to be twisted relative to one another about the first mechanism axis (2a), and the at least three clamping spheres (6) being mounted at positions of the second element (5), so as to be fixed relative to the second element (5) in a circumferential direction and in a radial direction, and so as to be able to roll along a circular line extending about the first mechanism axis (2a);

the second clamping mechanism (3) has at least three groove guides (9) in a groove element (8), the at least three groove guides (9) are disposed at identical angular spacings to the clamping spheres (6) along a circular line extending about the second mechanism axis (3a), and each of the groove guides (9) extends, in a respective access region (9a) thereof for introducing a respective one of the clamping spheres (6), parallel to the second mechanism axis (3a), and each of the guide grooves (9) extends, in a respective clamping portion (9b) thereof, partially about the second mechanism axis (3a), the clamping portions (9b) each being formed by a respective helical groove course having a respective tangential component about the second mechanism axis (3a), and the clamping portions (9b) each having a respective component parallel to the second mechanism axis (3a);

wherein each of the clamping spheres (6) has a respective first region (6a) protruding from the second element (5) and being radially spaced apart from the first mechanism axis such that, when coupling the first clamping mechanism (2) to the second clamping mechanism (3), the first regions (6a) of the clamping spheres (6), in an introduction position of the second element (5), are adapted to be guided through the access regions (9a) into the clamping portions (9b) and subsequently, by twisting the second element (5) relative to the first element (4) about the coupling axis (A), are adapted to be moved in the clamping portions (9b) to a clamping position which enables the first and the second contact face (2b, 3b) to be pressed against one another by way of the coupling force.

2. The clamping system (1) as claimed in claim 1, wherein the first clamping mechanism (2) has a support face (10) for the clamping spheres (6), which support face extends about the first mechanism axis (2a), the clamping spheres (6) resting on the support face (10) when second regions (6b) of the clamping spheres (6) face away from the first regions (6a).

3. The clamping system (1) as claimed in claim 2, wherein the first clamping mechanism (2) comprises a third element (11) which is disposed between the first element (4) and the second element (5) and which is mounted on at least one of the first or the second element (4, 5) so as to be rotatable about the first mechanism axis (2a), the support face (10) being formed on the third element (11).

4. The clamping system (1) as claimed in claim 3, wherein the third element (11) is mounted on the first element (4) by a rotary bearing (12) extending so as to be rotationally symmetrical about the first mechanism axis (2a), the clamping spheres (6) during coupling are adapted to be set in rotation along the helical groove courses, the clamping spheres (6) by virtue of their rotation and contact with the support face (10) render the third element (11) rotatable about the first mechanism axis (2a), and the rotary bearing (12), when the coupling force is building up, is adapted to reduce frictional forces between the rotating third element (11) and the first element (4).

5. The clamping system (1) as claimed in claim 4, wherein the rotary bearing (12) comprises a needle bearing or a ball bearing and allows forces transmittable by the clamping spheres (6) to the third element (11) at angles to the first mechanism axis (2a) to be able to be dissipated to the first element (4) at substantially the same angles.

6. The clamping system (1) as claimed in claim 1, further comprising a rotating mechanism (13, 14) which allows the second element (5) to be rotatable relative to the first element (4) about the first mechanism axis (2a), between the introduction position and the clamping position.

7. The clamping system (1) as claimed in claim 6, wherein the rotating mechanism (13, 14) comprises a spring mechanism (13) and an activation mechanism (14), the spring mechanism (13) allowing the second element (5) to be held by a preload force in the clamping position relative to the first element (4), and the activation mechanism (14) allowing the second element (5) to be movable relative to the first element (4), counter to the preload force, to the introduction position.

8. The clamping system (1) as claimed in claim 6, wherein the first clamping mechanism (2) comprises a first connection mechanism (16) which is adapted to be connected to a machine part, and the second clamping mechanism (3) comprises a second connection mechanism (18) which is adapted to be connected to an end effector (19).

9. The clamping system (1) as claimed in claim 8, wherein the first clamping mechanism (2) comprises a drive (20) having a drive shaft (21), and the second clamping mechanism (3) comprises an output shaft (22) which, when coupling the first clamping mechanism (2) to the second clamping mechanism (3), is adapted to be brought to connect to the drive shaft such that a rotating movement of the drive shaft is adapted to be transmitted to the output shaft so that the output shaft is rotated.

10. The clamping system (1) as claimed in claim 9, further comprising a first shaft end (21*a*) having a first formed contour, and a second shaft end (22*a*) having a second formed contour, the first formed contour being adapted to be brought to engage in a form-fitting manner with the second formed contour in an integer number n of relative rotational positions of the two shaft ends (21*a*, 22*a*).

11. The clamping system (1) as claimed in claim 10, wherein formed between the first shaft end (21*a*) and the second shaft end (22*a*) is a rotational alignment device (23) which comprises on the first shaft end (21*a*) at least one alignment groove (24), and on the second shaft end (22*a*) at least one preloaded, movable engagement element (25), a number of the alignment grooves (24) corresponding to a number n of the relative rotational positions, each said alignment groove (24) extending helically over an angular range of at least 360° /n, and for more than one said alignment groove (24), the alignment grooves (24) being distributed at identical angular spacings about the coupling axis.

12. The clamping system (1) as claimed in claim 9, wherein the drive shaft extends along the first mechanism axis (2*a*) so as to be radially within the first and the second element (4, 5), and the output shaft extends along the second mechanism axis (3*a*) so as to be radially within the groove element (8).

13. The clamping system (1) as claimed in claim 12, wherein the second connection mechanism (18) comprises a drive transmission for connecting the output shaft to a tool connector.

14. The clamping system (1) as claimed in claim 1, further comprising an alignment mechanism (15) which has engagement elements (15) on the first clamping mechanism (2) and on the second clamping mechanism (3), wherein the engagement elements (15), when the engagement elements (15) on the first clamping mechanism (2) and the engagement elements (15) on the second clamping mechanism (3) are coupling, engage in one another in a defined relative alignment of the first clamping mechanism (2) in relation to the second clamping mechanism (3) about the coupling axis (A), the engagement elements (15) being disposed such that, when coupling the first and second clamping mechanisms, the clamping spheres (6) are adapted to be introduced into the access regions (9*a*) when the second element (5) is in the introduction position.

15. A changing system having a robotic arm (17), a magazine (26) for end effectors (19), at least one end effector (19), and having at least one of the clamping systems (1) as claimed in claim 1, wherein the first clamping mechanism (2) of the at least one clamping system (1) is disposed on the robotic arm (17), and the second clamping mechanism (3) of the at least one clamping system (1) is disposed on the at least one end effector (19).

\* \* \* \* \*